US012421786B2

(12) United States Patent
Romero

(10) Patent No.: US 12,421,786 B2
(45) Date of Patent: *Sep. 23, 2025

(54) SHOCK INSULATING DOOR SYSTEM AND METHOD

(71) Applicant: OVERHEAD DOOR CORPORATION, Lewisville, TX (US)

(72) Inventor: Federico Romero, Corpus Christi, TX (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,775

(22) Filed: Oct. 10, 2023

(65) Prior Publication Data

US 2024/0035332 A1 Feb. 1, 2024

Related U.S. Application Data

(63) Continuation of application No. 17/233,160, filed on Apr. 16, 2021, now Pat. No. 11,808,081.

(Continued)

(51) Int. Cl.
*E06B 1/34* (2006.01)
*E06B 3/30* (2006.01)
(Continued)

(52) U.S. Cl.
CPC ................ *E06B 3/822* (2013.01); *E06B 1/34* (2013.01); *E06B 3/30* (2013.01); *E06B 3/7001* (2013.01); *E06B 2003/7046* (2013.01)

(58) Field of Classification Search
CPC ... E06B 1/32; E06B 1/34; E06B 1/342; E06B 1/345; E06B 1/347; E06B 1/26;
(Continued)

(56) References Cited

U.S. PATENT DOCUMENTS 1,287,622 A * 12/1918 Gogay ...................... E06B 1/34 52/214
1,301,930 A * 4/1919 Gogay ...................... E06B 1/34 52/211
(Continued)

FOREIGN PATENT DOCUMENTS

FR 2298676 A1 8/1976
GB 2078285 A 1/1982
(Continued)

OTHER PUBLICATIONS

European Patent Office, Extended European Search Report mailed Sep. 8, 2021, Application No. 21169449.2-1005, 7 pages.

*Primary Examiner* — Kyle J. Walraed-Sullivan
(74) *Attorney, Agent, or Firm* — Haynes and Boone, LLP

(57) ABSTRACT

A door system includes a sliding door panel and a cover. The sliding door panel is configured to slide within an opening and includes a frame forming at least a portion of a perimeter of the panel. The frame comprises a first material and includes a first frame member having a leading edge to slide into abutment with a surface adjacent to the panel, a trailing edge, and opposing sides connecting the leading and trailing edges. At least one side of the opposing sides includes a ridge protruding. The cover is configured to encase at least a portion of the leading and trailing edges. The cover comprises a second material and includes a groove formed into an interior surface of the cover and extending along a length of the cover, the groove configured to receive the ridge to retain the cover on the first frame member.

20 Claims, 7 Drawing Sheets

Related U.S. Application Data

(60) Provisional application No. 63/012,476, filed on Apr. 20, 2020.

(51) Int. Cl.
*E06B 3/70* (2006.01)
*E06B 3/82* (2006.01)

(58) Field of Classification Search
CPC ..... E06B 2003/2625; E06B 2003/0788; E06B 2003/7048; E06B 3/30; E06B 3/301; E06B 3/302; E06B 3/303; E06B 3/305; E06B 3/307; E06B 3/822; E06B 3/88
See application file for complete search history.

(56) References Cited

U.S. PATENT DOCUMENTS 1,620,933 A * 3/1927 Wilcox ................ A47B 95/043 174/136
2,755,895 A 7/1956 Walterman
2,837,787 A 6/1958 Wright
3,370,383 A * 2/1968 Riegelman ............ E06B 3/4609 49/425
3,391,509 A * 7/1968 Fruman ................... E04F 13/06 52/211
3,591,985 A * 7/1971 Coppins .................... E06B 1/64 49/504
3,757,473 A * 9/1973 Mundy ..................... E06B 1/10 49/505
3,924,373 A * 12/1975 Lizdas .................. E06B 1/6069 52/211
4,107,897 A 8/1978 Ullman, Jr.
4,207,707 A 6/1980 Holdiman
4,223,494 A * 9/1980 Wendt ....................... E06B 1/32 49/504
4,242,848 A * 1/1981 Schoultz .............. A47B 95/043 52/717.06
4,281,480 A * 8/1981 Wendt ....................... E06B 1/34 49/504
RE31,536 E * 3/1984 Holdiman ............... E06B 3/302 49/504
4,467,576 A 8/1984 Buergers
4,505,080 A 3/1985 Sailor
4,513,549 A * 4/1985 Wendt ....................... E06B 1/34 52/211
4,768,320 A * 9/1988 Weller .................... E04G 21/30 52/211
4,791,771 A * 12/1988 Haugaard ............... E06B 3/205 52/204.593
4,793,109 A * 12/1988 Noach ..................... E06B 1/347 52/211
5,182,880 A * 2/1993 Berge, Jr. .................. E06B 1/34 49/504
5,203,130 A * 4/1993 Freelove ................... E06B 1/64 52/211
5,214,880 A * 6/1993 Woodruff .............. E06B 7/2316 49/470
5,222,345 A * 6/1993 Riley ........................ E06B 1/34 52/717.03
5,249,399 A 10/1993 Aulson
5,339,583 A * 8/1994 Hrdlicka ................... E06B 3/56 52/204.5
5,454,198 A * 10/1995 Aulson ................... E06B 3/302 52/211
5,669,192 A * 9/1997 Opdyke .................... E06B 1/34 52/211
5,729,942 A * 3/1998 Moore, Jr. ................ E04C 1/40 52/211
5,737,878 A * 4/1998 Raulerson ................. E06B 1/34 52/717.01
5,758,458 A * 6/1998 Ridge ................... E06B 1/6007 49/504
5,775,045 A 7/1998 Hill
5,799,443 A * 9/1998 Koeniguer ................ E06B 3/88 16/404
5,815,998 A * 10/1998 Wamsher ................ E04G 21/30 52/211
5,916,077 A 6/1999 Tang
5,987,843 A 11/1999 Canfield
6,125,605 A 10/2000 Young
6,216,395 B1 4/2001 Kelly
6,343,438 B1 2/2002 Boldt
6,357,187 B1 * 3/2002 Haldeman ................. E06B 3/88 52/717.06
6,703,102 B1 * 3/2004 Prescott .................... E06B 1/34 428/99
6,826,877 B1 * 12/2004 Stradel ...................... E06B 1/34 52/211
7,861,465 B1 * 1/2011 Christ ..................... E06B 7/367 49/506
8,490,350 B1 * 7/2013 Greely ...................... E06B 1/34 52/287.1
10,208,526 B1 * 2/2019 Martin .................. E06B 3/9643
10,589,945 B2 3/2020 Martell
2001/0034985 A1 * 11/2001 Schweikart ............. E06B 3/302 52/204.5
2001/0049909 A1 12/2001 Homolka
2003/0041552 A1 * 3/2003 Hartley ..................... E06B 1/34 52/843
2004/0006938 A1 * 1/2004 Schiffmann ............. E04G 21/30 52/211
2004/0088933 A1 * 5/2004 Mayes .................... E04G 21/30 52/211
2004/0221527 A1 * 11/2004 Sykora ...................... E06B 1/34 52/213
2005/0055962 A1 * 3/2005 McElroy ................... E06B 1/34 52/716.1
2005/0097839 A1 * 5/2005 Kerscher ................... E06B 1/34 52/204.1
2005/0155291 A1 * 7/2005 Homolka .................. E06B 7/28 49/462
2005/0204657 A1 * 9/2005 Ellingson ................ E04G 21/30 52/204.1
2005/0257455 A1 * 11/2005 Fagan ....................... E06B 1/26 52/210
2006/0005470 A1 * 1/2006 Mullen ..................... E06B 1/70 49/467
2006/0059800 A1 3/2006 Minter
2006/0272247 A1 * 12/2006 Bartlett ..................... E06B 3/88 52/232
2007/0137120 A1 * 6/2007 Raymond ................. E06B 1/34 52/211
2008/0172956 A1 * 7/2008 Boldt ...................... E06B 3/302 52/475.1
2008/0178541 A1 * 7/2008 Kerscher ................... E06B 1/62 52/204.55
2008/0190031 A1 * 8/2008 Winkelmann ........ E05F 15/643 49/427
2008/0256881 A1 * 10/2008 Lowry ...................... E06B 3/88 52/211
2008/0256897 A1 * 10/2008 Lowry ...................... E06B 3/88 52/800.13
2009/0000224 A1 * 1/2009 Kerscher ................... E06B 1/32 52/204.1
2009/0049780 A1 * 2/2009 Pulte ..................... E04F 19/022 52/312
2009/0064609 A1 * 3/2009 Ouyang .................... E06B 1/34 52/211
2009/0173021 A1 7/2009 Katz
2009/0211183 A1 * 8/2009 Kerscher ................... E06B 1/62 52/204.1
2009/0211184 A1 8/2009 Kerscher
2010/0083597 A1 * 4/2010 Addison ................. E06B 3/306 52/204.53
2010/0251642 A1 * 10/2010 Erickson ................... E06B 1/34 52/312
2010/0326585 A1 * 12/2010 Wood .................. E04F 19/0495 52/718.01

(56) References Cited

U.S. PATENT DOCUMENTS

| | | | | |
|---|---|---|---|---|
| 2013/0219814 | A1* | 8/2013 | Piccirillo | E06B 1/342<br>428/192 |
| 2014/0325912 | A1* | 11/2014 | Header | E05D 15/0652<br>49/372 |
| 2015/0152659 | A1* | 6/2015 | Larochelle | E06B 1/342<br>52/514 |
| 2015/0159422 | A1 | 6/2015 | Pettit, III | |
| 2016/0076298 | A1* | 3/2016 | Header | E04F 19/02<br>52/204.5 |
| 2016/0130826 | A1* | 5/2016 | Larochelle | E06B 1/34<br>52/514 |
| 2018/0171699 | A1* | 6/2018 | Hoogland | E06B 3/302 |
| 2018/0258685 | A1* | 9/2018 | Pardue | E06B 7/2314 |
| 2018/0266167 | A1* | 9/2018 | Pinchot | E04G 21/30 |
| 2018/0371826 | A1* | 12/2018 | Strickland | E06B 3/76 |
| 2019/0242179 | A1* | 8/2019 | Wang | E06B 3/9632 |
| 2020/0165864 | A1* | 5/2020 | MacDonald | E06B 3/96 |
| 2020/0181971 | A1* | 6/2020 | Wang | E06B 3/66366 |
| 2020/0284086 | A1* | 9/2020 | Volpe | E06B 1/34 |
| 2021/0246710 | A1* | 8/2021 | Ko | E06B 1/52 |
| 2022/0098919 | A1* | 3/2022 | Baizeau | E06B 1/32 |

FOREIGN PATENT DOCUMENTS

| | | | |
|---|---|---|---|
| JP | 2017133171 | A | 8/2017 |
| JP | 2017145592 | A | 8/2017 |
| JP | 2019078094 | A | 5/2019 |
| KR | 200448617 | Y1 | 5/2010 |

* cited by examiner

SHOCK INSULATING DOOR SYSTEM AND METHOD

CROSS-REFERENCE TO RELATED APPLICATIONS

This patent application is a continuation of U.S. patent application Ser. No. 17/233,160, filed Apr. 16, 2021, which claims the benefit of and priority to U.S. Provisional Patent Application No. 63/012,476 filed Apr. 20, 2020 and entitled "SHOCK INSULATING DOOR SYSTEM AND METHOD," which are incorporated herein by reference in their entirety.

TECHNICAL FIELD

This patent disclosure relates generally to insulators and, more particularly, to a door system having an insulating and/or protective cover, such as a sleeve, to reduce the likelihood of a fire or a user being shocked by contacting the door system and/or prevent damage to a structure of the door system.

BACKGROUND

Some door systems can sometimes spark or shock a person or object that comes into contact with the door system due to discharge of static electricity. Some environments, such as hospitals or other healthcare facilities, may be an oxygen rich environment as a result of oxygen being used for therapeutic purposes. These environments may require precautionary measures to reduce accidents. For example, some intensive care unit (ICU) applications require measures to prevent sparks from occurring due to static to reduce the likelihood of igniting the oxygen.

In addition, some transit applications make it desirable to protect the public from electric shock that may occur when touching a train or other public transit vehicle which may be at a different electrical potential than a station door or boarding platform upon which passengers will embark. If passengers at one potential contact the public transit vehicle which is at another potential the passenger may receive an electric shock. As such, it may be desirable to have a door system that will reduce the likelihood of creating a shock or spark when brought into contact with a user or object using the door system.

SUMMARY

The foregoing needs are met to a great extent by embodiments in accordance with the present disclosure which, in some embodiments, allow for a door system that will reduce the likelihood of creating a shock or spark when brought into contact with a user or object using or near the door system.

In one aspect, the disclosure describes a door system comprising a door including a frame forming at least a portion of a perimeter of the door and a cover configured to encase at least a portion of the frame. The frame comprises a first material and the cover comprises a second material.

In another aspect, the disclosure describes a method of reducing electrical discharge in a door system. The method includes encasing at least a portion of an electrically conductive frame member of a door with an electrically insulating cover. The cover has a cross-sectional shape generally corresponding to a cross-sectional shape of the frame member.

In another aspect, the disclosure describes an apparatus configured to encase at least a portion of a frame of a door. The apparatus includes an electrically insulating cover comprising a material that is different than an electrically conductive material from which the frame of the door is constructed.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION

Figure 1:
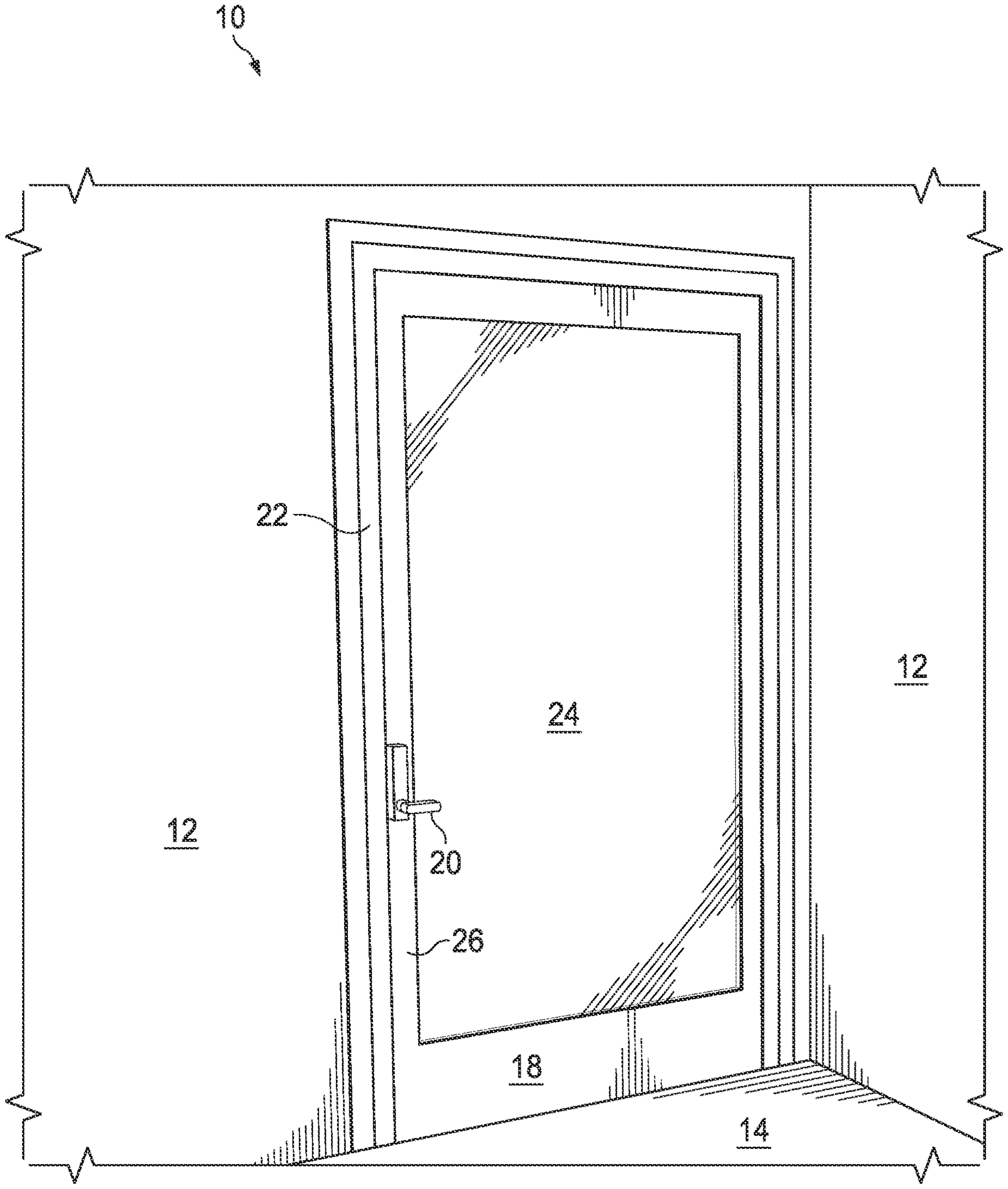
FIG. 1 is a perspective view of a door system in accordance with the present disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

FIG. 1 shows a door system 10 in accordance with an embodiment of the present disclosure. The door system 10 is installed in a wall 12. The floor 14 is also shown. The door system 10 includes a door 18 which may optionally be equipped with a handle 20. In other embodiments, other hardware may be mounted on the door 18 such as a push plate and/or kick plate. The door may be mounted with hinges such that the door pivots open and closed or may be mounted to slide such as in one or more tracks and/or on one or more roller assemblies.

The door 18 may be made of a frame 26 which may be made of a plurality of portions or members which, in some embodiments, are extrusions which may be aluminum, steel, or other suitable material. The door 18 often contains an insert 24 such as a window that spans across an opening 23 formed within the frame 26. The insert 24 may be made of glass, plexiglass, or other suitable material. The frame 26 of the door 18 surrounds and may support the window or other insert 24. The door 18 is mounted in a door frame 22. The door frame 22 is mounted in the wall 12.

Figure 2A:
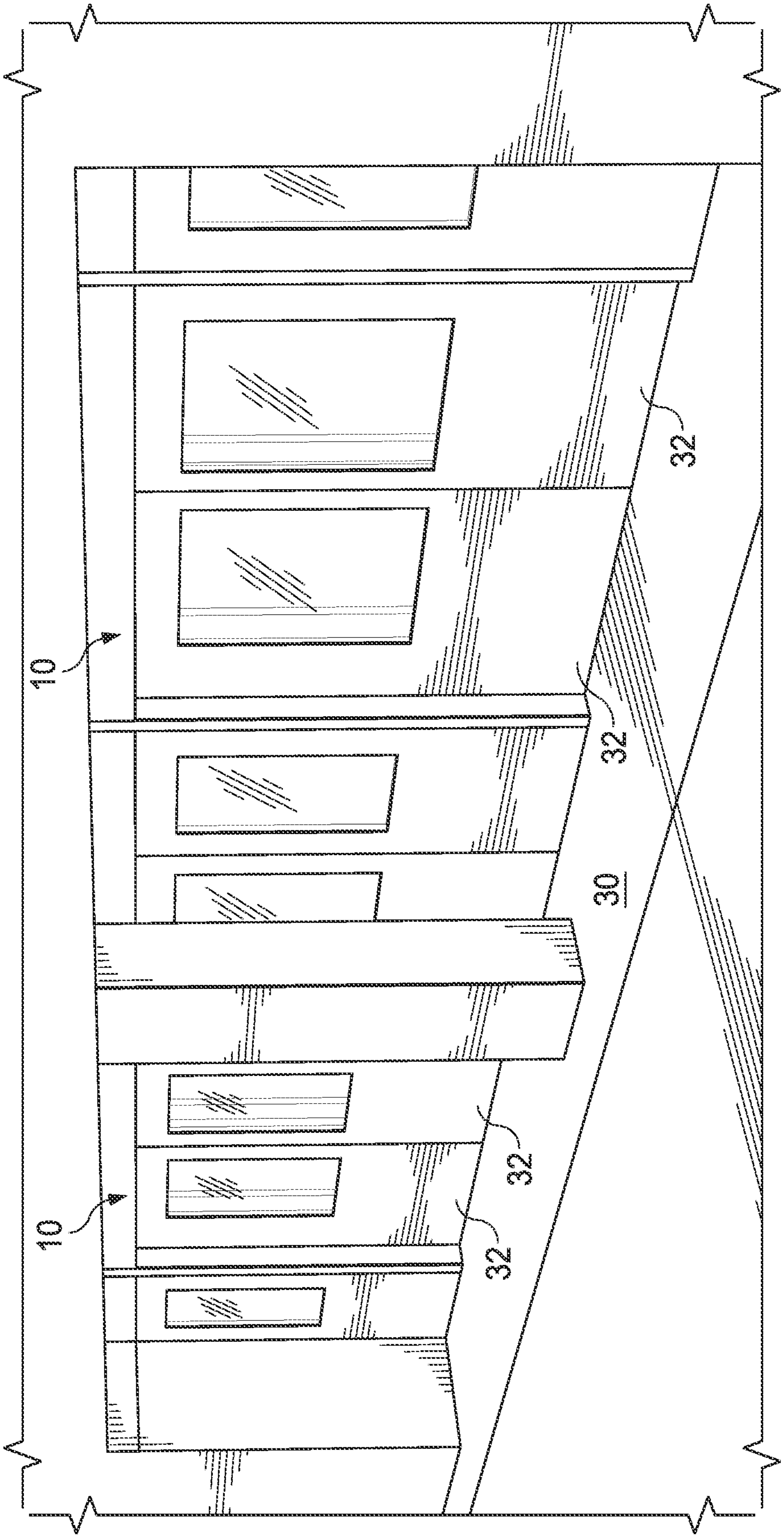
FIG. 2A is a perspective view of a train at a boarding platform with the platform doors and train doors closed.
Figure 2B:
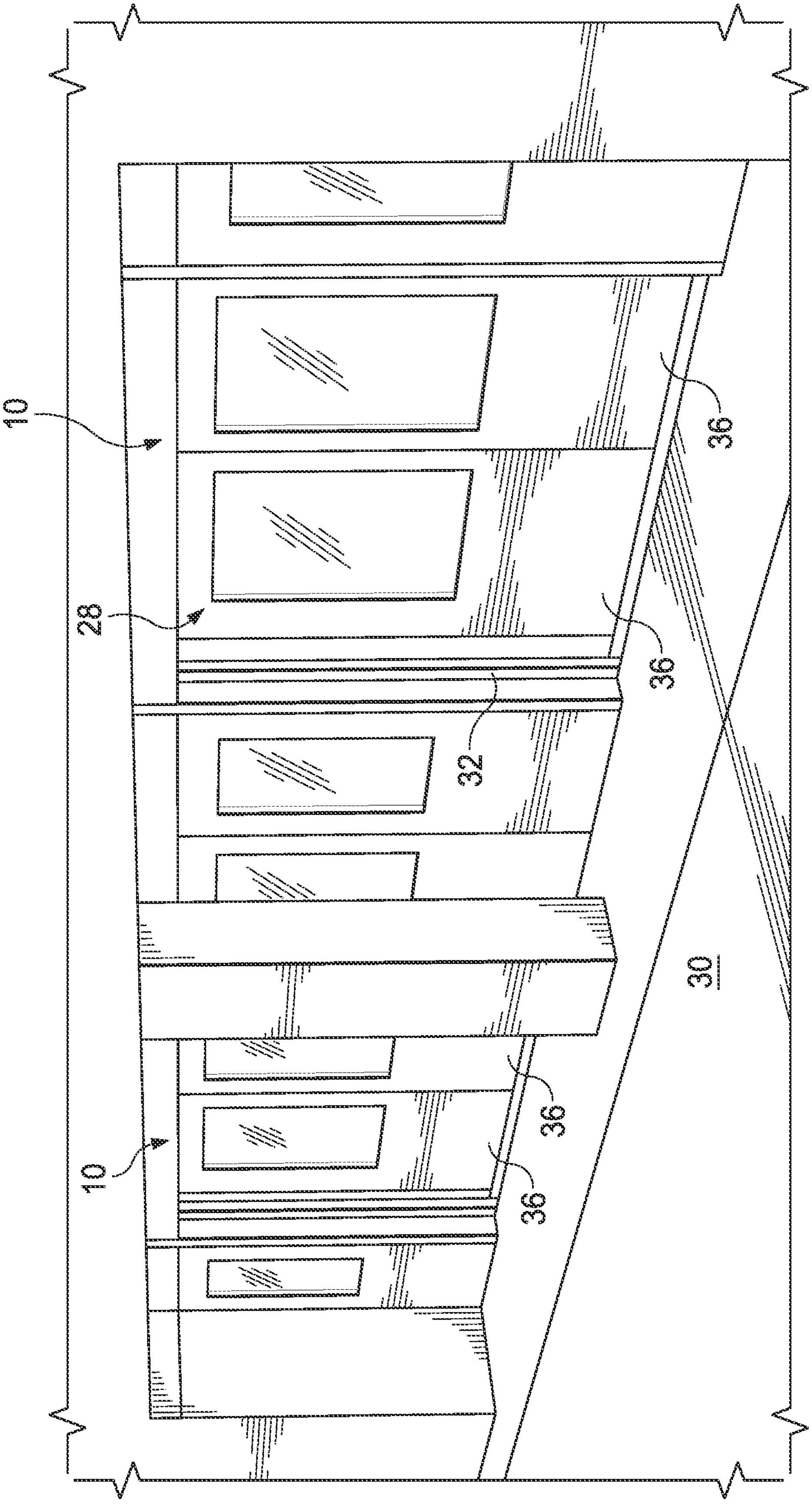
FIG. 2B is a perspective view of a train at a boarding platform with the platform doors opened and train doors closed.

In other embodiments, the door system 10 may be used in transit systems. For example, FIGS. 2A and 2B show a train platform 30. Some platforms 30 such as the ones shown in FIGS. 2A and 2B include platform door systems 10 which include platform doors 32. Other platforms 30 may be open platforms and not include platform doors 32. FIG. 2B shows the platform doors 32 slid to an open position exposing the train 28 and train door system 10 with train doors 36. The train doors 36 may slide to open or closed positions.

Figure 3:
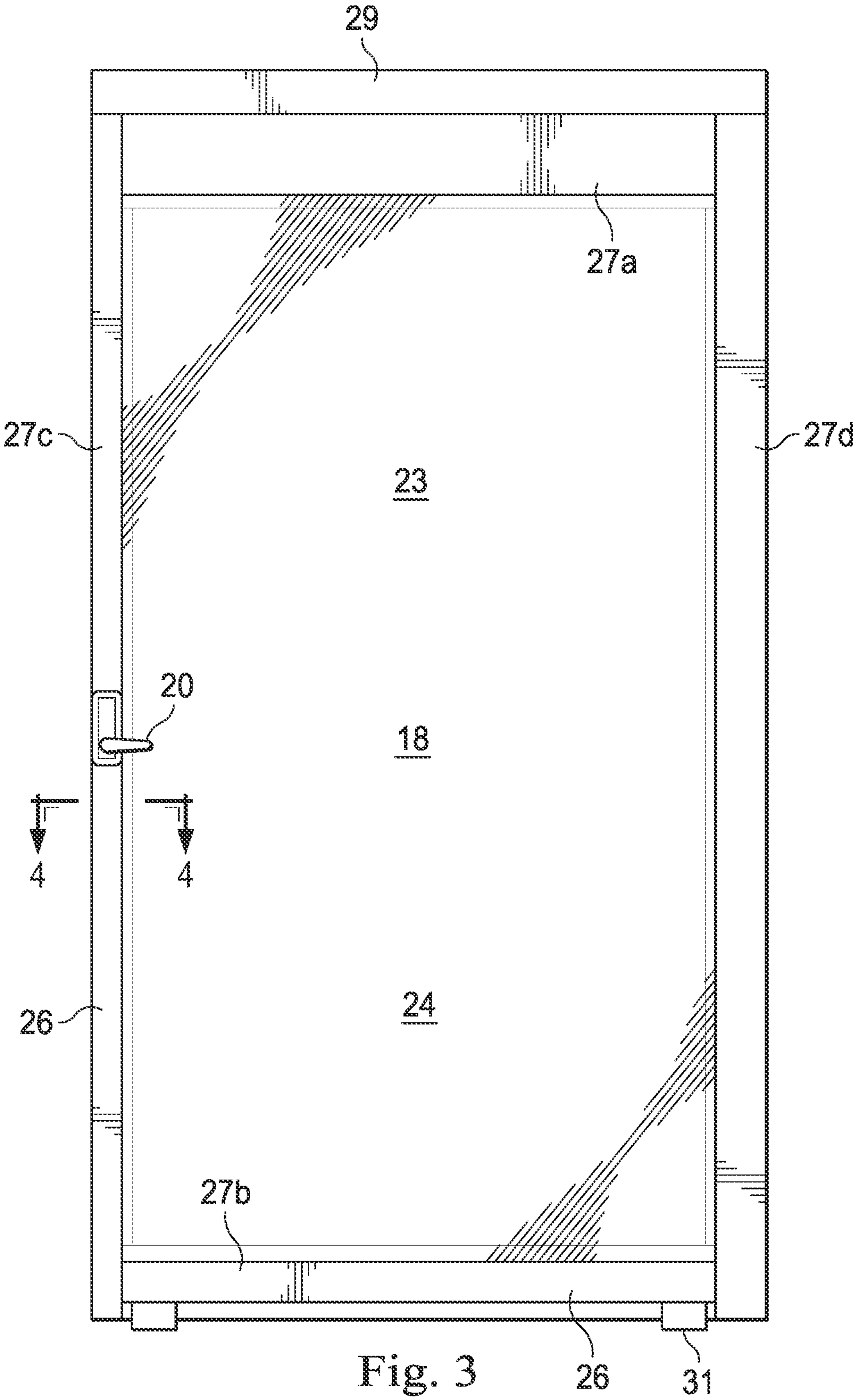
FIG. 3 is a front view of a door such as one used on a train.

FIG. 3 shows an example door 18, which may be similar to door 18 of FIG. 1 but mounted to slide rather than pivot, in accordance with the present disclosure. The door 18 has a frame 26 comprising a plurality of frame members including, but not limited to, a top frame member 27*a*, a bottom frame member 27*b*, a first side frame member 27*c*, and an opposing second side frame member 27*d*. It should be appreciated that any number of frame members may be assembled together to form a frame. The top frame member 27*a* may be secured to a hanger assembly 29 to facilitate sliding of the door 18. One or more bottom guides 31 may be secured to the bottom frame member 27*b* to maintain alignment of the door 18 as it slides. For example, the bottom guides 31 may extend into a slot in a floor, a door frame, or platform.

The door 18 includes an insert 24. The insert 24 may be transparent, translucent, or opaque. For example, the insert 24 may be a window made of glass, plexiglass, plastic or other suitable material. The door 18 has a frame 26 that surrounds and supports the insert 24. Optionally, the door 18 has a handle 20 or other hardware such as put not limited to push plates, kick plates and the like. Any suitable type of handle 20 such as a lever, knob, gripping recess, etc. may be used.

Figure 4:
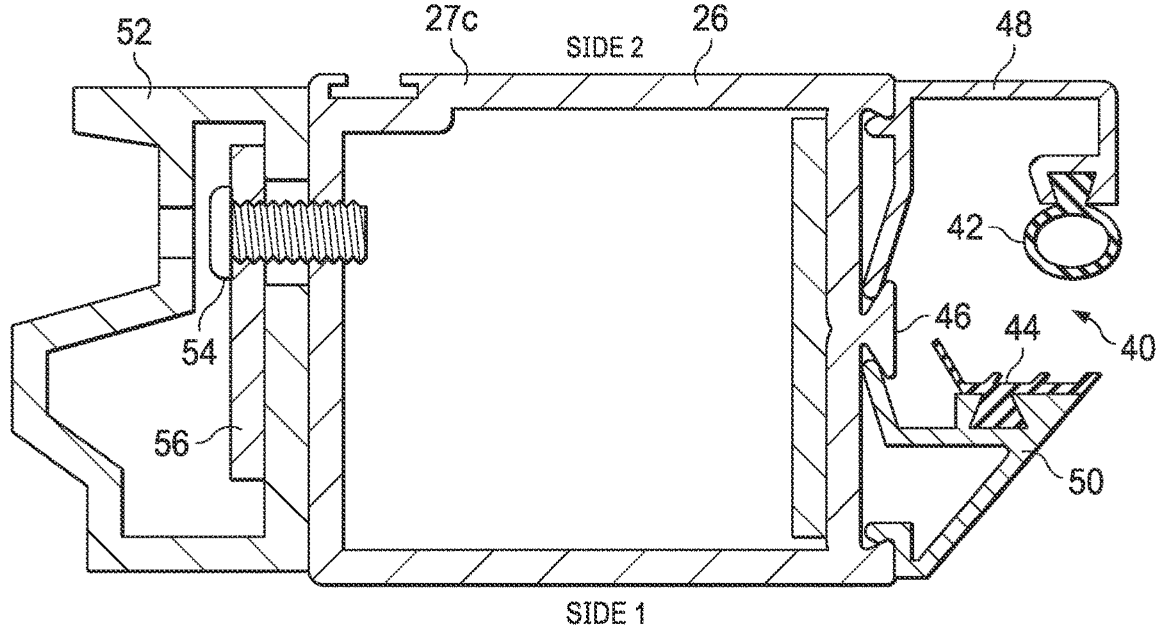
FIG. 4 is a cross-sectional view of a portion of the door taken along line 4-4 in FIG. 3.
Figure 5:
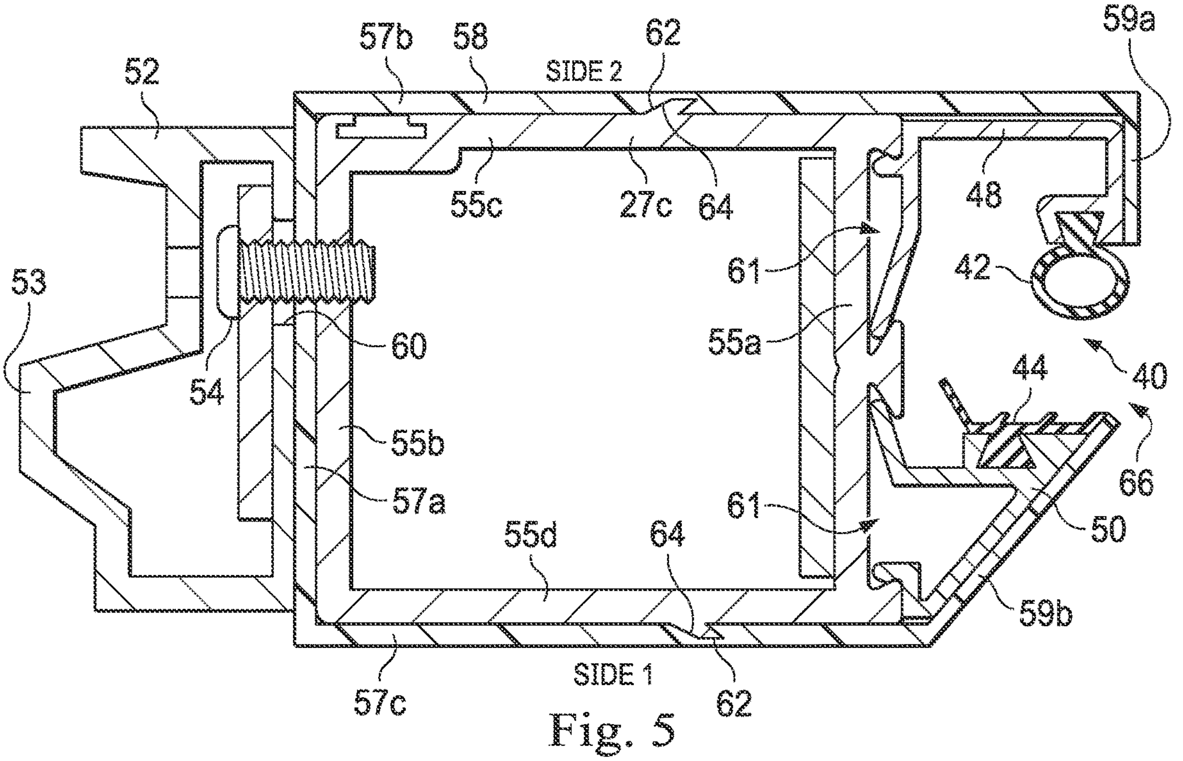
FIG. 5 is a cross-sectional view of a portion of the door taken along line 4-4 of FIG. 3 on which a cover is installed.

FIGS. 4 and 5 illustrate cross-sections of a portion of a frame member of a door, for example, along the line 4-4 through the first side frame member 27*c* of the door 18 of FIG. 3. However, it should be appreciated that the views of FIGS. 4 and 5 may be similarly applicable to the door 18 of FIG. 1, the platform doors 32 of FIG. 2A, the train doors 36 of FIG. 2B, or any other suitable door such as a hospital door in an oxygen-rich medical environment.

FIGS. 4 and 5 show the cross-sectional view of the first side frame member 27*c* of an embodiment of a door 18. As illustrated, the first side frame member 27*c* has a generally rectangular cross-sectional shape. The term "generally rectangular" as used herein with reference to a cross-section may refer to any shape which resembles a rectangle, including a square, even though various recesses, pockets, openings, or protrusions may extend into or from the primary surfaces of such a shape. The illustrated embodiment of the first side frame member 27*c* includes an internal wall 55*a*, an external wall 55*b*, and two lateral walls 55*c*, 55*d* extending between the internal wall and the external wall, thereby forming a generally rectangular cross-section. Although the implementation shown is generally rectangular, other implementations of the first side frame member may be any metallic shaped member. In some implementations, it is a hollow metallic shaped member which may be tubular, cylindrical, arced, triangular, or any other suitable shape.

A frame member 27 may include an insert retaining structure 40. The insert retaining structure 40 serves to attach the insert 24 to the frame 26 of the door and retains the insert 24 in the door. In the example cross-section shown in FIGS. 4 and 5, the insert retaining structure 40 includes a first seal 42 and second seal 44 and an insert stop 46. The first seal 42 is attached to a first retaining bracket 48 and the second seal 44 is attached to a second retaining bracket 50. The insert stop 46 may limit movement of the insert 24 toward the frame member and may also provide a mating feature such as one or more channels 61 to mate with or otherwise receive a portion of the first and second retaining brackets 48, 50. In the illustrated embodiment, the frame 26 forms two channels 61 for receiving a portion of the first and second retaining brackets 48, 50, respectively, for securing the retaining brackets to the frame 26. The retaining brackets 48, 50 may slide into the channel 61 and be captured by the channels or may be snap-fit into the channels. It should be appreciated that any suitable means for securing the retaining brackets 48, 50 to the frame 26 may be used such as, for example, an adhesive or a fastener. Further, in some embodiments the first and second retaining brackets 48, 50 may be formed as a single retaining bracket or one or both retaining brackets may be omitted altogether.

A nosing assembly 52 may be attached to the frame 26 on an opposing side from the retaining brackets 48, 50, for example, by at least one fastener 54 and a nosing assembly retaining plate 56. The nosing assembly 52 may provide a relatively soft surface that is configured to contact a corresponding surface of a door frame 22, as may be the case in medical environments, or of an opposing sliding door 32, 36, as may be the case in transit applications. The nosing assembly 52 may include a resilient member 53 and a rigid nosing assembly retaining plate 56 may aid in connecting the nosing assembly 52 to the frame 26, where use of one or more fasteners 54 alone may result in tearing or deterioration of the nosing assembly 52. In other embodiments, the nosing assembly 52 may attach to the frame 26 in another suitable way. For example, but not limiting, the nosing assembly 52 may attach to the frame 26 by an adhesive or slide in a track in the frame 26 and be captured by the track.

The resilient member 53 of the nosing assembly 52 may itself be electrically insulating such that the nosing assembly 52 may be disposed outside of the sleeve 58 without increasing the risk of electric shock or sparking. In this regard, as shown in FIGS. 4 and 5, components of the nosing assembly 52 which may be metallic in some embodiments, such as the fasteners 54 and nosing assembly retaining plate 56, may be disposed inside a hollow chamber of the resilient member of the nosing assembly 52 to insulate those components. A hole 60 may extend through an outer wall of the resilient member of the nosing assembly 52 to permit fasteners to be inserted into the hollow chamber for securing the nosing assembly 52 to a frame 26. Alternatively, one or both of the nosing assembly retaining plate 56 and fasteners 54 may be constructed of materials which are electrically insulating.

In operation, the nosing assembly 52 may be slid into contact with an adjacent and corresponding surface of a door frame 22 or opposing door. The resilient member of the nosing assembly 52 may deform to absorb the impact when closing the door and/or to form a seal between the frame 26 and the adjacent surface.

Figure 6:
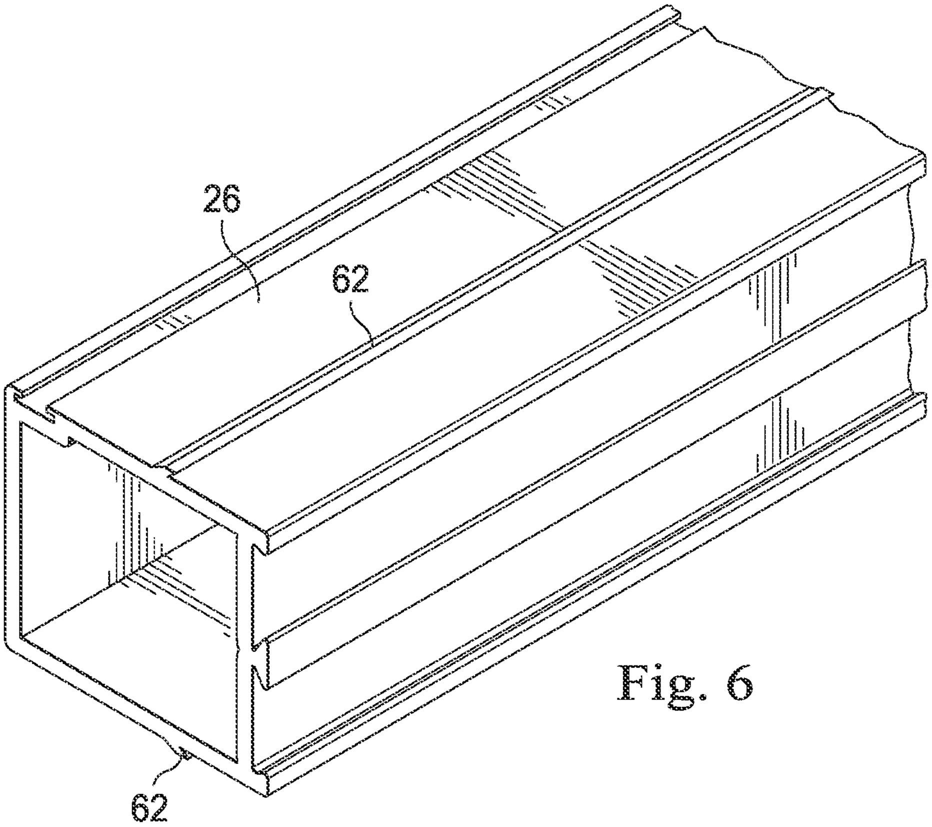
FIG. 6 is a partial perspective view of a frame member of the door of FIG. 4.
Figure 7:
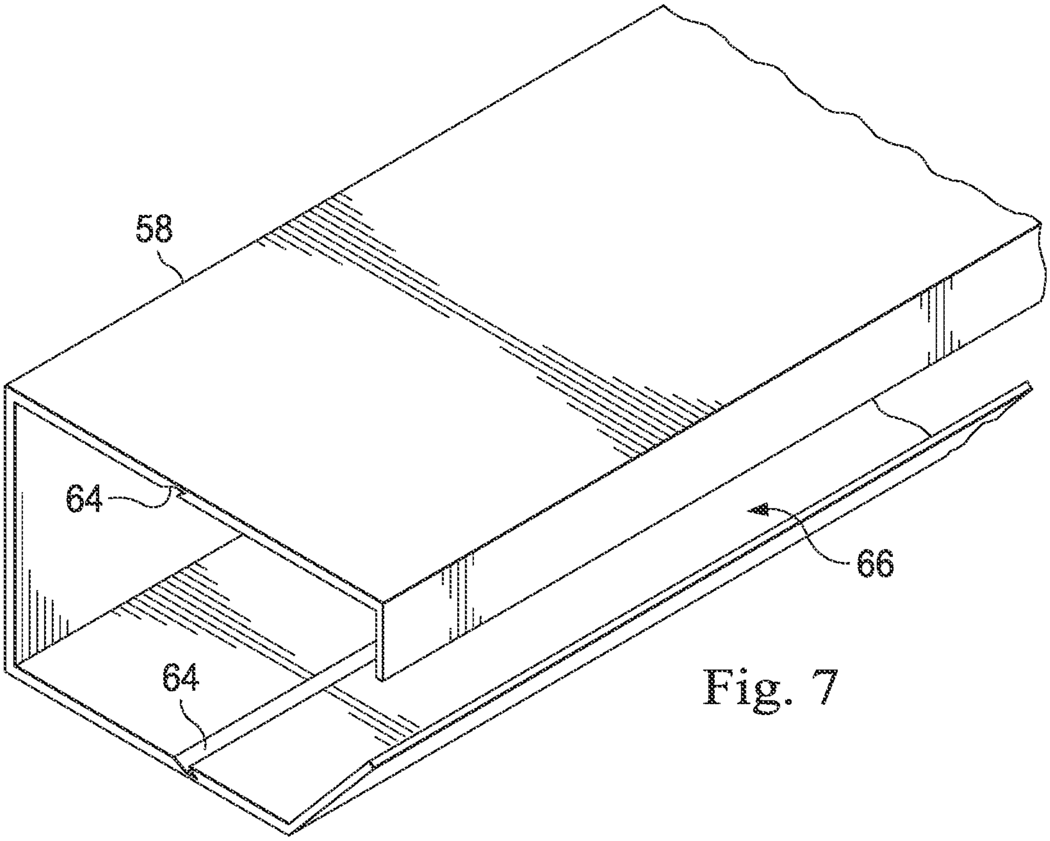
FIG. 7 is a partial perspective view of the cover of FIG. 5.

FIG. 5 shows an electrically insulating and/or protective sleeve 58 (hereinafter "sleeve") fitted over the frame member 27*c*. It will be appreciated that the embodiment of a cover illustrated in the figures is a sleeve which wraps around a plurality of surfaces of a door, but the disclosure herein is applicable to any cover applied to a door system having the features described herein. For example, several distinct members may be applied to a door to form a cover, such as applying a first member to a front side of the door, a second member to the back side of the door, and a third member to the leading edge of the door generally spanning between the first and second members. In this regard, the term 'sleeve' used herein includes a one-piece member covering at least a portion of plurality of faces of a door but may also generally be considered as including any cover, including but not limited to a cover covering one face (or portion thereof) of a door or a cover comprising a plurality of separate protective and/or insulating members. FIG. 6 is a perspective view of the frame 26 of FIG. 5 and FIG. 7 is a perspective view of the sleeve 58 of FIG. 5. The sleeve 58 may be rubber, plastic, polymer, or any other suitable material. The sleeve 58 is generally shaped to correspond to the shape of the frame member to fully or partially encase, encapsulate, conceal, surround, insulate, or otherwise cover the frame member around its cross-sectional shape. However, the sleeve 58 may not need to exactly conform to the shape of the frame member as shown by the open side 66 that may not exactly conform to the insert retaining structure Additionally, the sleeve 58 may only cover a portion or all of one side (or face) of a frame member 27, two sides, three sides, four sides, all sides, etc. For example, in some embodiments, the sleeve 58 may primarily only cover the outermost surface of the frame which is most susceptible to contact with users or other surfaces. In the illustrated embodiment, the sleeve 58 includes a first wall 57*a* which is configured to conform to the external wall 55*b* of the frame member 27*c*, and second and third walls 57*b*, 57*c* which are configured to conform to the lateral walls 55*c*, 55*d* of the frame member 27*c*. Additionally, the sleeve 58 may include one or more lateral projections 59*a*, 59*b* which extend inwardly toward a space defined by the second and third walls 57*b*, 57*c* of the sleeve 58. The lateral projections 59*a*, 59*b* may be oriented perpendicular to their respective wall of the sleeve or may extend at any suitable angle with respect thereto. In some embodiments, one or both lateral projections 59*a*, 59*b* may conform to at least a portion of the retaining structure 40 to electrically insulate the retaining structure and/or to aid in securing the sleeve 58 to the frame 26. In this regard, one or both lateral projections 59*a*, 59*b* may grip the frame 26 in a manner which prevents the sleeve 58 from sliding off the frame laterally.

It should be appreciated that some or all frame members (e.g., top, sides, bottom) may receive a sleeve 58. For example, in some applications, only those frame members 27 most susceptible to contact may receive a sleeve such as the leading member supporting a handle 20, e.g., the first side frame member 27*c*. Similarly, all or only a portion of a frame member may receive a sleeve 58. For example, in a transit application, portions of a platform door 32 or train door 36 nearest patrons' arms and shoulders may receive a sleeve 58 while portions of the door near the platform 30 or door header may remain uncovered.

In some embodiments, the sleeve 58 is made of a resilient material. In instances where a frame member is made from an extruded material or otherwise has a generally consistent cross section, the sleeve 58 can be slid over the frame member. The fastener 54 may extend through a hole 60 in the sleeve 58. If a door is equipped with a handle 20 or other hardware, the handle 20 or other hardware may be installed after the sleeve 58 is installed and attached to the frame 26 in a non-conducting manner (such as with non-conducting fasteners or concealed structural fasteners).

In some embodiments, the frame 26 may include one or more retaining structures 62 that fit in one or more corresponding locking structures 64 in the sleeve 58. A retaining structure 62 and corresponding locking structure 64 cooperate to aid in retaining the sleeve 58 on the frame 27. An example of a retaining structure 62 may include a hook, a barb, a ridge, or similar protrusion extending from a surface of the frame 26. An example of a locking structure 64 may include a recess, a channel, a slot, or similar structure formed into the sleeve 58. The retaining structure 62 and locking structure 64 may each be formed of a plurality of discrete protrusions and recesses. However, in embodiments in which the sleeve 58 and/or corresponding frame 26 are formed from extrusions, the retaining structure 62 and locking structure 64 may extend the entire length of the respective sleeve 58 and frame member 27. It should be appreciated that, in some embodiments, the retaining structure 62 may be disposed on the sleeve 58 and the locking structure 64 may be disposed on the frame 26.

As shown in FIGS. 5-7, the retaining structure 62 and corresponding locking structure 64 are shaped so that the sleeve 58 can slide over the frame member 27, but the retaining structure 62 and corresponding locking structure 64 will resist rotation of the sleeve 58 with respect to the frame 26 and/or translational movement of the sleeve 58 away from the frame 26 similar to how a dovetail joint and/or tongue and groove system works. In some embodiments, the sleeve 58 may be slid onto a frame member longitudinally with the retaining structure 62 and locking structure 64 aligned. In other embodiments, the sleeve 58 may be slid onto a frame member transverse to a longitudinal axis of the sleeve 58 through the open side 66 until one or more locking structures 64 receive one or more retaining structures 62. In some embodiments, a sleeve 58 may be flexible and/or resilient to allow the opening of the open side 66 to expand to receive the frame member. This arrangement may be more suitable for embodiments in which a sleeve 58 is attached after the door has been assembled or for retrofit installations of a sleeve 58.

It should be appreciated that a sleeve 58 may not always be pre-formed and then applied to a frame member 27. Rather, in some embodiments, a sleeve 58 may be formed directly on a frame member 27. For example, a sleeve may be applied to a frame member 27 by spraying a protective or insulating material onto the frame, or dipping the frame member 27 into the material, and then curing the material.

It will be understood that the shape of a frame member 27 and corresponding insulating sleeve 58 will vary from one door system 10 to another. Further, each frame member 27 (e.g., top, bottom, left side, and right side members) may require different sleeves having different geometries to ensure a suitably conforming fit. In some embodiments, a sleeve 58 may generally conform to a majority (e.g., contact over at least 51% of the surface area) of a corresponding shape of a member of a frame 26. In some embodiments, a door system 10 may comprise four frame members 27 having four distinct cross-sectional shapes and may further comprise four sleeves 58 each having cross-sectional shapes corresponding to the frame members.

By fitting a sleeve 58 over all or part of the frame 26 of the door, a user is less likely to be shocked and a spark is less likely to occur when the user or an object contacts or nears the door. Further, it will be understood that the sleeve 58 may be damage resistant by nature of its resiliency, however, in the event of a damaged sleeve 58, the damaged sleeve 58 can be replaced with a new sleeve 58 if needed. All or a portion of a damaged sleeve may be slid off of the frame 26 and a new sleeve may be slid into place.

In some embodiments, the sleeve 58 can be a cover to help protect the frame members 27 from damage and may or may not have insulating properties. In such instances, the sleeve 58 will receive the wear from contact and weathering rather than the frame 26 and the sleeve 58 can be replaced when needed or worn.

In some embodiments, some disassembly of the door system 10 may be needed to install a new sleeve 58. Further, existing frame members 27 which may not initially have sleeves 58 may be fitted with insulating and/or protective sleeves 58. Such a retrofit may allow a formerly non-insulated door system 10 to become insulated or an unprotected door system 10 to become protected. In such embodiments, existing frame members 27 may lack a retaining structure 62, such as illustrated in FIG. 4, and a sleeve 58 may be secured to such frame members using fasteners, an adhesive, or any other suitable means. For example, a sleeve 58 may have a snug conforming shape such that the sleeve 58 itself grips onto a frame member 27. Additionally or alternatively, a frame member 27 may be modified to receive a sleeve 58. For example, a channel or recess may be cut into a member of a frame so that a corresponding protrusion or ridge on a sleeve 58 may be mated to the frame. Where a nosing assembly 52 is present, such a nosing assembly may be removed to allow a sleeve 58 to be installed after which the nosing assembly may be replaced.

Figure 8:
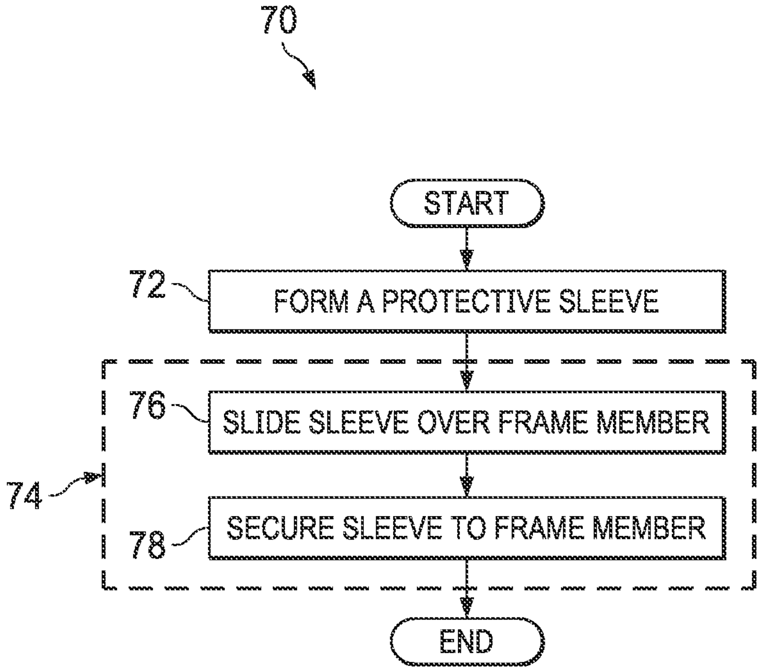
FIG. 8 is a flowchart of a method of according to the present disclosure.

FIG. 8 illustrates a method 70 for reducing electrical discharge or preventing damage in a door system. The method may include a process 72 forming an insulative and/or protective sleeve comprising a first material that is different than a second material from which a door frame onto which the sleeve is to be installed is constructed. In some embodiments, the door frame may be formed from an electrically conductive material and the sleeve may be formed from an electrically insulating material. In some embodiments, the door frame may be susceptible to damage and wear and tear from contact with objects which may pass through the door and the sleeve may be formed from a material that protects the door frame from damage and may or may not be replaceable. Process 72 may include any method of manufacturing a sleeve made from a rubber, plastic, thermoplastic, polymer, etc. in accordance with the present disclosure such as extruding, injection molding, directly spraying, or dipping. Process 74 may include encasing at least a portion of at least one frame member of a door with the sleeve. Encasing the frame member may include a process 76 of sliding the sleeve onto the frame member and a process 78 of securing the sleeve to the frame member. The sleeve may be secured to the frame member by any suitable means such as, but not limited to, engagement of corresponding mating features of the sleeve and the frame member (e.g., a ridge and a channel), an adhesive, one or more fasteners, gripping the frame member with lateral protrusions of the sleeve, etc.

Some embodiments of the method 70, particularly when used for retrofitting an existing door, may include removing hardware such as door handles or nosing assemblies prior to the process 74 of encasing the frame member and may include reinstalling the hardware after process 74. Reinstalling the hardware may include cutting, drilling, or otherwise forming openings through the sleeve to allow the hardware components to be reinstalled in their original locations.

It should be appreciated that the various processes of the method 70 discussed above may be optional as not all of the described processes are required for implementing the method. Unless expressly stated as being required, each process should be considered optional.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure. It should be appreciated that the geometry and features shown in this disclosure are non-limiting examples.

What is claimed is:

1. A door system comprising:

a sliding door panel including a frame, the frame forming at least a portion of a perimeter of the sliding door panel and configured to slide within an opening, wherein the frame comprises a first material and includes a first frame member having a leading edge configured to slide into abutment with a surface adjacent to the sliding door panel, a trailing edge, and opposing sides connecting the leading edge to the trailing edge, wherein at least one side of the opposing sides includes a ridge protruding outward and extending along a length of the first frame member; and a cover configured to encase at least a portion of the leading edge and at least a portion of the trailing edge, wherein the cover comprises a second material and includes a groove formed into an interior surface of the cover and extending along a length of the cover, the groove configured to receive the ridge to retain the cover on the first frame member.

2. The door system of claim 1, wherein the first material is a metal and the second material is non-metallic.

3. The door system of claim 2, wherein the second material is resilient and the cover is configured to shield at least a portion of the frame from damage.

4. The door system of claim 2, wherein the metal is electrically conductive and the second material is electrically insulating.

5. The door system of claim 4, wherein the second material comprises at least one of a plastic, a rubber, a fiberglass, or a polymer.

6. The door system of claim 1, wherein the frame of the door panel comprises a plurality of frame members including the first frame member, and wherein the cover is a sleeve having a cross-sectional shape configured to conform to at least a majority of a cross-sectional shape of at least the first frame member of the plurality of frame members.

7. The door system of claim 6, wherein the first frame member is formed as a first extrusion having a constant cross-sectional shape and the sleeve is formed as a second extrusion having a constant cross-sectional shape.

8. The door system of claim 6, wherein the first frame member has a generally rectangular cross-sectional shape comprising an internal wall configured to face an opposing second frame member of the frame, an external wall opposite the internal wall and configured to face outward from the door panel, and two lateral walls extending between the internal wall and the external wall, and wherein at least a portion of the sleeve has a generally corresponding rectangular cross-sectional shape comprising:

a first wall of the sleeve configured to contact an external surface of the external wall of the first frame member;

a second wall and a third wall of the sleeve extending perpendicularly from the first wall, each of the second and third walls configured to contact a respective one of the lateral walls of the first frame member; and an open side opposite the first wall.

9. The door system of claim 6, wherein the sleeve is configured to be received on the first frame member by sliding the sleeve over the first frame member longitudinally from a longitudinal end of the first frame member with the ridge and groove generally aligned.

10. The door system of claim 6, wherein the sleeve is configured to be received on the first frame member by sliding the sleeve over the first frame member through an open side of the sleeve in a direction transverse to a longitudinal axis of the first frame member until the ridge is received in the groove.

11. The door system of claim 1, wherein the ridge is angled outward toward the trailing edge of the first frame member.

12. The door system of claim 1, wherein the sliding door panel comprises a transit system door panel.

13. The door system of claim 12, wherein the transit system door panel comprises a platform door panel configured for use in a train platform.

14. The door system of claim 1, further comprises a second sliding door panel including a second frame, the second frame forming at least a portion of a perimeter of the second sliding door panel and configured to slide within the opening, wherein the second frame comprises the first material and includes a second frame member having a leading edge configured to slide into abutment with the leading edge of the sliding door panel.

15. The door system of claim 14, wherein the second frame member includes a second ridge protruding outward and extending along a length of the second frame member.

16. The door system of claim 15, further comprising a second cover configured to encase at least a portion of the leading edge of the second frame member, wherein the second cover comprises the second material and includes a second groove formed into an interior surface of the second cover and extending along a length of the second cover, the second groove configured to receive the second ridge to retain the second cover on the second frame member.

17. A method of reducing electrical discharge in a door system comprising:

extruding an electrically conductive frame member of a sliding door panel, the electrically conductive frame member forming at least a portion of a perimeter of the sliding door panel and configured to slide within an opening, the electrically conductive frame member comprising a first material and having a leading edge configured to slide into abutment with a surface adjacent to the sliding door panel, a trailing edge, and opposing sides connecting the leading edge to the trailing edge, wherein at least one side of the opposing sides includes a ridge protruding outward and extending along a length of the electrically conductive frame member;

extruding an electrically insulating cover with a cross-sectional shape generally corresponding to a cross-sectional shape of the electrically conductive frame member, wherein the electrically insulating cover comprises a second material and includes a groove formed into an interior surface of the electrically insulating cover and extending along a length of the electrically insulating cover, the groove configured to receive the ridge to retain the electrically insulating cover on the electrically conductive frame member; and encasing at least a portion of the electrically conductive frame member with the electrically insulating cover, wherein the electrically insulating cover is configured to encase the leading edge of the electrically conductive frame member and at least a portion of the trailing edge, opposite the leading edge, of the electrically conductive frame member.

18. The method of claim 17, wherein encasing at least the portion of the electrically conductive frame member comprises: sliding the electrically insulating cover onto the electrically conductive frame member; and securing the electrically insulating cover to the electrically conductive frame member with an adhesive or a fastener.

19. The method of claim 18, wherein the electrically insulating cover is secured to the electrically conductive frame member by engagement of the ridge and the groove.

20. A door system comprising:

a sliding door panel including a frame forming at least a portion of a perimeter of the sliding door panel, wherein the frame comprises an electrically conductive material and includes a first frame member having a leading edge configured to abut a surface adjacent to the sliding door panel when in a closed configuration, a trailing edge, and opposing sides connecting the leading edge to the trailing edge, wherein at least one side of the opposing sides includes a first engagement structure protruding outward and extending along a length of the first frame member, wherein the door system is prone to electrical discharge between the leading edge and the surface when the leading edge is moved into contact with the surface; and a cover configured to encase at least a portion of the frame including the leading edge, wherein the cover comprises a second material configured to electrically insulate the frame to prevent the electrical discharge, wherein the cover is interposed between the leading edge and the surface in the closed configuration, wherein the cover includes a second engagement structure configured to engage the first engagement structure to retain the cover on the frame.

* * * * *